US006036868A

United States Patent [19]

Sivakumar et al.

[11] Patent Number: 6,036,868

[45] Date of Patent: Mar. 14, 2000

[54] USE OF HYDROPHILIC DISPERSION POLYMERS FOR OILY WASTEWATER CLARIFICATION

[75] Inventors: Ananthasubramanian Sivakumar, Naperville; Patrick Gerard Murray, Yorkville, both of Ill.

[73] Assignee: Nalco Chemical Company, Naperville, Ill.

[21] Appl. No.: 09/121,438

[22] Filed: Jul. 23, 1998

[51] Int. Cl.[7] .......... C02F 1/56

[52] U.S. Cl. .......... 210/708; 210/734; 516/174

[58] Field of Search .......... 210/708, 725, 210/727, 728, 734; 516/174

[56] References Cited

U.S. PATENT DOCUMENTS

| | | | |
|---|---|---|---|
| 3,585,148 | 6/1971 | Sackis | 252/344 |
| 3,920,599 | 11/1975 | Hurlock et al. | 260/29.64 |
| 4,120,815 | 10/1978 | Raman | 252/341 |
| 4,151,202 | 4/1979 | Hunter et al. | 260/567.6 R |
| 4,160,742 | 7/1979 | Raman | 252/344 |
| 4,929,655 | 5/1990 | Takeda et al. | 524/458 |
| 5,006,590 | 4/1991 | Takeda et al. | 524/458 |
| 5,294,347 | 3/1994 | Byrne et al. | 210/708 |
| 5,330,650 | 7/1994 | Byrne et al. | 210/708 |
| 5,332,507 | 7/1994 | Braden et al. | 210/708 |
| 5,560,832 | 10/1996 | Sivakumar et al. | 210/708 |
| 5,587,415 | 12/1996 | Takeda | 524/458 |
| 5,614,602 | 3/1997 | Connors et al. | 526/307.3 |
| 5,635,112 | 6/1997 | Ramesh et al. | 252/341 |
| 5,643,460 | 7/1997 | Marble et al. | 210/705 |
| 5,696,194 | 12/1997 | Connors et al. | 524/417 |
| 5,702,613 | 12/1997 | Sommese et al. | 210/708 |
| 5,707,533 | 1/1998 | Connors et al. | 210/734 |
| 5,708,071 | 1/1998 | Takeda | 524/458 |
| 5,750,034 | 5/1998 | Wong Shing et al. | 210/705 |
| 5,938,937 | 8/1999 | Sparapany et al. | 210/728 |

FOREIGN PATENT DOCUMENTS

| | | |
|---|---|---|
| 0 821 099 A1 | 1/1998 | European Pat. Off. . |
| 0 831 177 A2 | 3/1998 | European Pat. Off. . |
| 7-71678 | 8/1995 | Japan . |

*Primary Examiner*—Peter A. Hruskoci
*Attorney, Agent, or Firm*—Michael B. Martin; Thomas M. Breininger

[57] ABSTRACT

A method for removing emulsified oil from industrial waste water streams utilizing dispersion copolymers is disclosed. Preferred dispersion copolymers are poly (dimethylaminoethylacrylate methyl chloride quaternary salt/acrylamide) and poly (diallyldimethyl ammonium chloride/acrylamide).

6 Claims, No Drawings

USE OF HYDROPHILIC DISPERSION POLYMERS FOR OILY WASTEWATER CLARIFICATION

FIELD OF THE INVENTION

A method for removing emulsified oil from industrial waste water streams utilizing water continuous dispersion copolymers is disclosed. Preferred water continuous dispersion copolymers are poly(dimethylaminoethylacrylate methyl chloride quaternary salt/acrylamide) and poly (diallyldimethyl ammonium chloride/acrylamide).

BACKGROUND OF THE INVENTION

In industry, oily waste waters are produced in various processes located in the steel and aluminum industries, chemical processing industry (CPI), automotive industry, laundry industry and refinery industry. In these industries, highly refined oils, lubricants and greases contact water for various purposes according to the particular industry. This results in a highly dispersed or severe oil-in-water emulsion in the waste water streams.

For example, in the steel and aluminum industries, waste water from steel and aluminum mills using hot rolling mills contain lubricating and hydraulic pressure hydrocarbons. Waste water from cold rolling mills contains oils that lubricates the sheets and reduces rust. Specifically, in cold rolling mills, oil-in-water emulsions are sprayed on the metal during rolling to act as coolants. Also, metalworking plants generate waste water streams containing lubricating and cutting oils, lapping and deburring compounds, grinding and other specialty fluids. These oils are generally highly refined hydrocarbons.

Refinery waste oil comes from two different sources: (1) Skimmings from the water clarification equipment, i.e., DAF's, API separators, and consisting mainly of crude oil; and, (2) Leakage from processes collected via traps and drains throughout the plant. This oil is usually sent to a waste water treatment plant.

One type of waste oil is formed during the process of removing dispersed oil from waste water in waste water treatment plants. The oil (called "float" or "skimmings") is concentrated in clarification vessels such as dissolved air floatation units (DAFs), induced gas floatation units (IGFs), corrugated plate interceptors (CPIs), and holding tanks. The oil floats to the top of these units, is removed by mechanical means and then stored. This waste oil may then be disposed of by incineration, sent to oil reclamation sites, or treated on-site. These waste oils have a minimum of 50% to 95% oil and contain emulsified water and solids which are stabilized by chemicals used to remove the oil from the waste water.

Waste waters from cotton and wool manufacturing plants contain oils and greases from the scouring, desizing and finishing operations. Finishing oils used in cotton and wool manufacturing to reduce friction and snagging of fibers on spinning machines end up in the waste water. Processes in other industries also generate oily waste water such as: paints, surface coatings, and adhesives; soaps and detergents; dyes and inks; and the leather industry. In each of the industries described above, the oils used in process ultimately contaminate waste water streams as highly dispersed or oil-in-water emulsions.

The emulsified oil in the waste water is typically present in the range of several hundred to tens of thousands of ppm. It is critical to remove this oil from a waste stream before discharge from an environmental standpoint. The United States Environmental Protection Agency has placed strict restrictions on total oil and grease (TOG) limits for water that is to be discharged into public drinking water supplies or into open bodies of water. The removal of this oil is very critical to meeting the established discharge limits for total dissolved solids (TSS), carbon oxygen demand (COD), biological oxygen demand (BOD) and total organic carbon (TOC) into local sewers and rivers. Not only has the EPA established strict limits on the oil and grease discharge, these industries are affected by local city ordinances as well.

An emulsion is an intimate mixture of two liquid phases, such as oil and water, in which the liquids are mutually insoluble and where either phase may be dispersed in the other. An oily waste emulsion, in which oil is dispersed in the water phase, may contain any of a variety of oils in a wide range of concentrations. These oils are defined as substances that can be extracted from water by hexane, carbon tetrachloride, chloroform, or fluorocarbons: In addition to oils, typical contaminants of these emulsions may be solids, silt, metal particles, emulsifiers, cleaners, soaps, solvents, and other residues. The types of oils found in these emulsions will depend on the industry. They may be lubricants, cutting fluids, heavy hydrocarbons such as tars, grease, crude oils, and diesel oils, and also light hydrocarbons including gasoline, kerosene, and jet fuel. Their concentration in the waste water may vary from only a few parts per million to as much as 5 to 10% by volume.

A stable oil-in-water emulsion is a colloidal system of electrically charged oil droplets surrounded by an ionic environment. Emulsion stability is maintained by a combination of physical and chemical mechanisms.

Emulsions may be broken by chemical, electrolytic, or physical methods. The breaking of an emulsion is also called resolution, since the aim is to separate the original mixture into its parts. Chemicals are commonly used for the treatment of oily waste waters, and are also used to enhance mechanical treatment. In breaking emulsions, the stabilizing factors must be neutralized to allow the emulsified droplets to coalesce. The accumulated electric charges on the emulsified droplet are neutralized to allow the emulsified droplets to coalesce. The accumulated electric charges on the emulsified droplet are neutralized by introducing a charge opposite to that of the droplet. Chemical emulsion breakers provide this opposite charge, and are thus usually ionic in nature.

The treatment of oily waste water in normally divided into two steps, i.e., coagulation, which is the destruction of the emulsifying properties of the surface active agent or neutralization of the charged oil droplet, and flocculation, which is the agglomeration of the neutralized droplets into large, separable globules. The term oily waste water refers to an oil-in-water emulsion which may contain oil, dispersed solids, and water.

Historically, dry polymers, solution polymers, and inverse emulsion latexes have been used to treat the waste water. Each material has its own advantages and disadvantages.

Water-in-oil emulsions of water-soluble vinyl addition polymers, referred to herein as latex polymers, are used quite frequently, though they have several disadvantages. The first disadvantage is that the latex polymer must be inverted prior to use, which complicates the process of feeding the polymer into the system. Numerous problems associated with this feeding method have caused many users to avoid latex polymers. Additionally, the latexes generally have a narrow treating range, which can result in overtreatment at higher dosages. Furthermore, latex polymers add even more oil to the stream to be treated because latex polymers typically include 20–30% by weight of a hydrocarbon continuous phase. Of course, adding more oil and surfactants to the system is undesirable when treating waste water streams.

Although solution polymers require no prior make up, active polymer content and molecular weight characteristics of these polymers are inherently limited. These coagulants are often used to break oil-in-water emulsions, but they are unable to flocculate the dispersed oil, thus requiring an adjunct chemical (a flocculant) to complete the process.

Water-soluble cationic polymers for the removal of emulsified oil from oil field produced water have been disclosed in U.S. Pat. No. 5,330,650. Dispersions of water-soluble cationic polymers for the removal of emulsified oil from ethylene quench water have been described in U.S. Pat. No. 5,294,347. A method for recycling waste oil fluids with a dispersion of a water-soluble cationic polymer is disclosed in U.S. Pat. No. 5,332,507. Additionally, water-soluble dispersion polymers for purposes such as flocculating and/or dehydrating sludge or for separating and treating oil-containing industrial waste water have been disclosed in U.S. Pat. Nos. 4,929,655; 5,006,590; 5,708,071; 5,587,415; and JP 7-71678. However, such polymers are hydrophobic dispersions, as they are polymerized from at least 5% of monomers of general formula II.

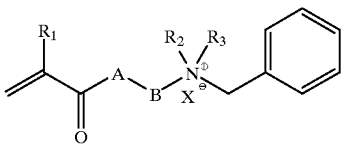

Moreover, hydrophilic dispersion polymers have been disclosed for use in the pulp and paper industries to increase retention and drainage in EP 0 831 177 A2; for deinking in U.S. Pat. No. 5,750,034 and for treating recycled coated broke in EP 0 821 099 A1. However, there is no indication that such polymers would also be demulsifiers.

Water-soluble cationic dispersion polymers having less than 5 mole percent benzyl functionality which may be used as demulsifiers are disclosed in U.S. Pat. Nos. 5,614,602; 5,696,194 and 5,707,533. However, the dispersion polymers disclosed therein are hydrophobic, due to the incorporation of substituted acrylamides as from 1 to about 50 mole percent N-alkyl acrylamide, N,N-dialkylacrylamide or mixtures thereof. Moreover, attempts to make polymers without incorporation of substituted acrylamide monomers failed, as disclosed in comparative examples 1 and 2, column 9 of U.S. Pat. No. 5,707,533. Therefore, these patents represent a teaching away from the hydrophilic dispersion polymers of the type which we have discovered.

SUMMARY OF THE INVENTION

A method for removing emulsified oil from industrial waste water streams utilizing water continuous dispersion copolymers is disclosed. Preferred water continuous dispersion copolymers are poly(dimethylaminoethylacrylate methyl chloride quaternary salt/acrylamide) and poly (diallyldimethyl ammonium chloride/acrylamide).

DESCRIPTION OF THE INVENTION

One aspect of this invention is a method of breaking an oil-in-water emulsion which comprises the steps of:

a) treating the emulsion with a demulsifying amount of a water-soluble dispersion polymer, said water-soluble polymer formed under free-radical forming conditions in a medium containing water, monomers, stabilizer polymer and an aqueous anionic salt solution, wherein said water-soluble polymer is formed from polymerization of
   i. (meth)acrylamide; and
   ii. and at least one cationic monomer selected from the group consisting of:
      diallyl-N,N-disubstituted ammonium halides wherein the substituents of said disubstituted ammonium halides are selected from the group consisting of: $C_1$–$C_{20}$ alkyl groups, aryl groups, alkylaryl groups and arylalkyl groups,
      and monomers of the general formula I

I

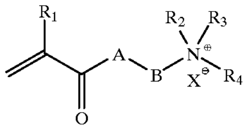

wherein $R_1$ is selected from the group consisting of hydrogen and methyl groups, $R_2$ and $R_3$ are selected from the group consisting of $C_1$ alkyl and $C_2$ alkyl groups; $R_4$ is selected from the group consisting of hydrogen, $C_1$ alkyl and $C_2$ alkyl groups; A is selected from the group consisting of an oxygen atom and NH; B is selected from the group consisting of $C_2$ alkyl, $C_3$ alkyl and $C_4$ alkyl groups and $X^-$ is an anionic counterion;

b) separating said emulsion into an oil phase and a water phase; and, c) recovering said water phase.

Another aspect of this invention is a method of breaking an oil-in-water emulsion which comprises the steps of:

a) treating the emulsion with a demulsifying amount of a water-soluble dispersion polymer, said water-soluble polymer formed under free-radical forming conditions in a medium containing water, monomers, stabilizer polymer and an aqueous anionic salt solution, wherein said water-soluble polymer is formed from polymerization of:
   i. (meth)acrylamide;
   ii. a cationic monomer selected from the group consisting of:
      diallyl-N,N-disubstituted ammonium halides wherein the substituents of said disubstituted ammonium halides are selected from the group consisting of $C_1$–$C_{20}$ alkyl groups, aryl groups, alkylaryl groups and arylalkyl groups and
      monomers of the general formula I

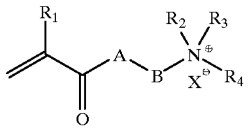

wherein $R_1$ is selected from the group consisting of hydrogen and methyl groups, $R_2$ and $R_3$ are selected from the group consisting of $C_1$ alkyl and $C_2$ alkyl groups; $R_4$ is selected from the group consisting of hydrogen, $C_1$ alkyl and $C_2$ alkyl groups; A is selected from the group consisting of an oxygen atom and NH; B is selected from the group consisting of $C_2$ alkyl, $C_3$ alkyl and $C_4$ alkyl groups and $X^-$ is an anionic counterion; and iii. less than 5% of monomers according to general formula II

II

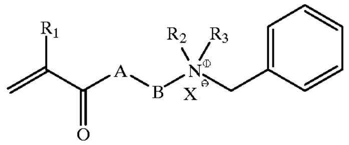

wherein $R_1$ is selected from the group consisting of H and $CH_3$, $R_2$ and $R_3$ are selected from the group consisting of $C_1$ alkyl and $C_2$ alkyl, A is selected from the group consisting of 0 and NH, B is selected from the group consisting of $C_2$ alkyl, $C_3$ alkyl and $C_4$ alkyl groups, and $X^-$ is an anionic counterion;

b) separating said emulsion into an oil phase and a water phase; and, c) recovering said water phase.

The steps of separation and recovery may be carried out in any conventional manner generally known to those skilled in the art. Preferably, the hydrophilic dispersion polymer of the invention is a copolymer of dimethylaminoethyl (meth) acrylate methyl chloride quat (DMAEA·MCQ) cationic monomer and (meth)acrylamide or diallyldimethyl ammonium chloride and (meth)acrylamide. It has been found that the polymers described above confer advantages for use in a process which generates oily waste water. Specifically, the hydrophilic dispersion polymers of the invention show improved activity with respect to emulsion breaking as compared to the commercial standard DMAEA methyl chloride quaternary latex of the same charge, and also as compared to hydrophobic water soluble, water continuous dispersion polymers. The use of these flocculants affords removal of particulate materials without the unwanted addition of oils and surfactants contained in conventional latex polymers. Additionally, these flocculants require no inverter system and can be introduced to the process stream using simple feeding equipment. Latex is defined within this application as a water-in-oil emulsion polymer.

THE MONOMERS

As utilized herein, the term arylalkyl is meant to encompass benzyl groups and phenethyl groups.

As concerns the diallyl,-N,N-disubstituted ammonium halide monomers, the disubstituents of the monomer may be $C_1$–$C_{20}$ alkyl groups, aryl groups, alkylaryl groups or arylalkyl groups. Moreover, each of the di-substituents can be a different group. For example, one intended halide is N-methyl-N-ethyl-N,N-diallyl ammonium chloride. Another example of a specific halide is DADMAC (diallyl dimethyl ammonium chloride). Preferably, the amount of diallyl dimethyl ammonium chloride present in the copolymer is from about 5 mole percent to about 30 mole percent. Diallyl-N,N-disubstituted ammonium halides, especially diallyldimethyl ammonium chloride are well-known and commercially available from a variety of sources. In addition to chloride, the counterion may also be bromide, sulfate, phosphate, mono-hydrogen phosphate and nitrate among others. One method for the preparation of DADMAC is detailed in U.S. Pat. No. 4,151,202, the disclosure of which is hereinafter incorporated by reference into this specification.

I

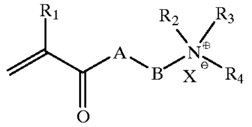

Examples of the monomer represented by Formula I above include salts such as dimethylaminoethyl (meth) acrylate, diethylaminoethyl(meth)acrylate, dimethylaminopropyl (meth)acrylamide, dimethylhydroxypropyl(meth) acrylate, and methylated and ethylated quaternary salts. A specific example of one applicable (meth)acrylate quaternary is DMAEA.MCQ (dimethylaminoethyl acrylate methyl chloride quaternary salt). Preferably, the amount of DMAEA.MCQ present in the copolymer is from about 5 mole percent to about 50 mole percent. Dialkylaminoalkyl (meth) acrylate quaternaries, especially DMAEA.MCQ are available commercially from a variety of sources.

The term quaternary salt as used herein contemplates the use of any conventional quaternizing agent, as for example, methyl chloride, methyl bromide, methyl iodide and dimethyl sulfate.

THE POLYVALENT ANIONIC SALTS

The polyvalent anionic salt to be incorporated in the aqueous solution according to the present invention is suitably a sulfate, a phosphate or a mixture thereof. Preferable salts include ammonium sulfate, sodium sulfate, magnesium sulfate, aluminum sulfate, ammonium hydrogen phosphate, sodium hydrogen phosphate and potassium hydrogen, phosphate. In the present invention, these salts may be each used as an aqueous solution thereof having a concentration of 15% or above.

THE DISPERSANT

A dispersant polymer (also referred to as stabilizer polymer) is present in the aqueous anionic salt solution in which the polymerization of the above monomers occurs. The dispersant polymer is a water-soluble high molecular weight cationic polymer. The dispersant polymer is preferably soluble in the above-mentioned aqueous salt solution. The dispersant polymer is preferably used in an amount of from 1 to 10% by weight based on the total weight of the monomers. The dispersant polymer is composed of cationic monomer units of diallyl disubstituted ammonium halide or N,N-dialkylaminoethyl(meth)acrylates and their quaternary salts. Preferably, the residual mole % is acrylamide or methacrylamide. The molecular weight of the dispersant is preferably in the range of 10,000 to 10,000,000. Preferred dispersants are homopolymers of diallyldimethyl ammonium chloride, dimethylaminoethylacrylate methyl chloride quaternary salt and dimethylaminoethylmethacrylate methyl chloride quaternary salt. According to one embodiment of the invention, a multifunctional alcohol such as glycerin or polyethylene glycol is coexistent in the polymerization system. The deposition of the fine particles is smoothly carried out in the presence of these alcohols.

THE DISPERSION POLYMERS

Procedures representative of the methods for the synthesis of the hydrophilic dispersion polymers are disclosed in U.S.

Pat. No. 5,750,034, the disclosure of which is hereby incorporated by reference. For the polymerizations, a usual water-soluble radical-forming agent can be employed, but preferably water-soluble azo compounds such as 2,2'-azobis (2-amidinopropane) hydrochloride and 2,2'-azobis(2-(2-imidazolin-2-yl)propane) dihydrochloride are used.

According to one embodiment of the invention, a seed polymer is added before the beginning of the polymerization of the above monomers for the purpose of obtaining a fine dispersion, or, alternately, is formed in-situ before the addition of more monomer. The seed polymer is a water-soluble cationic polymer insoluble in the aqueous solution of the polyvalent anion salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 1 mole percent of cationic monomer units of dimethylaminoethyl acrylate methyl chloride quaternary salt. According to one embodiment of the invention, the seed polymer used in one polymerization reaction is the water-soluble polymer prepared in a previous reaction which used the same monomer mixture.

Preferably, the dispersion polymer is polymerized from acrylamide and a cationic monomer which is dimethylaminoethyl acrylate methyl chloride quaternary salt, and the mole ratio of acrylamide to dimethylaminoethyl acrylate methyl chloride quaternary salt is from about 95:5 to about 50:50; or the cationic monomer may also be diallyldimethyl ammonium chloride and the mole ratio of acrylamide to diallyldimethyl ammonium chloride is from about 95:5 to about 50:50. The hydrophilic dispersion polymer may have a cationic charge of from about 5 mol % to about 50 mol %.

We have discovered that hydrophobic character is less advantageous for the efficient demulsification of oily waste waters. Therefore, use of such monomers as N-mono- or -di-substituted acrylamides in any amount, and dimethylaminoethyl (meth)acrylate benzyl chloride quaternary salt in more than 5% mole ratio, would result in a polymer having a degree of hydrophobic character rendering it less suitable for the purposes described herein. By contrast, the dispersion polymers of the instant invention do not have hydrophobic character, as they do not contain monomers of the type defined above.

Additionally, conventional coagulants, conventional flocculants, alum, or a combination thereof may also be utilized as adjuncts with the dispersion polymers, though it must be emphasized that the dispersion polymer does not require any adjunct for optimization of activity.

Furthermore, the range of intrinsic viscosities for the hydrophilic dispersion polymers of the invention may be from about 0.5 to about 15 dl/g. Depending upon the conditions at the process being treated, dosage may be within the range of from about 1 ppm (0.0001%) to about 5000 ppm (0.5%), with the preferred dose from about 0.5 to about 500 ppm. Exacerbated conditions may require a greater dosage.

When removal of waste oil from oil-in-water emulsions is effected by a chemical demulsifier such as the copolymer prepared hereunder, the emulsion-breaker is added to the suction side of the supply pump, or influent of a DAF unit. The effective amount will vary, depending upon the application and types of oils present. Waste oil, as described herein may encompass oils such as lubricants, grease and dispersed solids among others as described above. It does appear that dependent upon the particular system, a maximally effective dosage will be reached at a certain point. Above that dosage level, the polymer begins to overtreat the system, which causes a decrease in the clarity of the waste waters.

The following examples are presented to describe preferred embodiments and utilities of the invention and are not meant to limit the invention unless otherwise stated in the claims appended hereto.

EXAMPLE 1

The jar test was used to evaluate the hydrophilic dispersion polymers as demulsifiers in an oily waste water (API influent) from a refinery. The demulsifier to be tested was added to 100 ml of the waste water obtained from refineries at the desired concentration and mixed using a Phipps and Bird gang stirrer for 2 minutes at 330 rpm and then mixed for 3 minutes at 30 rpm. The solution was then allowed to stand for 2 minutes. A subnatant aliquot was then drawn and the turbidity of the water was measured using a Hach ratio/xR turbidimeter. The results of the test are tabulated below in Table I–IV. Units of turbidity in all tables are NTU. A lower value indicates greater demulsification has occurred. For comparison purposes, the turbidity of the untreated oily waste water was measured at 400 NTU. Polymer C, representative of the polymers of the instant invention was compared to polymer A, a hydrophobic dispersion copolymer and polymer B, the same chemistry as polymer C in the form of a latex.

The replacement ratio measurement found in Tables I–IV is an indication of polymer efficiency, that is, how much dose is required to obtain a certain performance level. The replacement ratio of an experimental polymer is calculated with reference to a standard polymer. For example in Table III, A is the conventional hydrophobic dispersion polymer poly(dimethylaminoethyl acrylate benzyl chloride quaternary salt/acrylamide) and C is the polymer of the instant invention, a hydrophilic dispersion polymer poly (dimethylaminoethyl acrylate methyl chloride quaternary salt/acrylamide). The performance level selected is a turbidity of 46 NTU, which is the lowest turbidity achieved. The dose of polymer A to achieve this turbidity is 10 ppm while that of C is 6 ppm. The replacement ratio therefore is 6/10=0.6, which would illustrate that Polymer C provides unexpectedly superior results.

Table I shows a comparison of hydrophilic dispersion polymer C, representative of the novel polymers disclosed herein to latex copolymer B of the same chemistry as hydrophilic dispersion polymer C and to hydrophobic dispersion polymer A. C results in a greater reduction of turbidity at lower dosages than the other polymers. Therefore, the hydrophilic dispersion polymers described herein represent a significant advance in demulsification technology because they can be utilized effectively at low dosages.

TABLE I

Turbidity as a Function of Polymer Dosage

| | Treatment | | |
|---|---|---|---|
| Dose[1](ppm) | A[2] | B[3] | C[4] |
| 1 | 65.7 | 70.2 | 52 |
| 2 | 54.9 | 54 | 36.4 |
| 3 | 34 | 46.4 | 32.1 |

TABLE I-continued

| Turbidity as a Function of Polymer Dosage | | | |
|---|---|---|---|
| | Treatment | | |
| Dose[1](ppm) | A[2] | B[3] | C[4] |
| 4 | 26.6 | 40.9 | 27.9 |
| RR[5] | 1 | — | 0.7 |

[1]on an equal actives basis
[2]hydrophobic dispersion copolymer poly(DMAEA.BCQ/AcAm), 10/90 mole ratio, RSV = 15–20 dL/g measured at a concentration of 0.045% polymer in 0.25 M $NaNO_3$, available from Nalco Chemical Co. of Naperville, IL
[3]latex polymer poly(DMAEA.MCQ/AcAm) 10/90 mole ratio, RSV = 13–21 dL/g measured at a concentration of 0.045% polymer in 1 M $NaNO_3$, available from Nalco Chemical Co. of Naperville, IL
[4]hydrophilic dispersion copolymer poly(DMAEA.MCQ/AcAm) 10/90 mole ratio, RSV = 15–20 dL/g measured at a concentration of 0.045% polymer in 1 M $NaNO_3$, available from Nalco Chemical Co. of Naperville, IL
[5]replacement ratio Table II provides a comparison of hydrophilic dispersion polymer C, representative of the polymers disclosed herein to polymer A in a different waste water stream than that which was demulsified to provide the results of Table I, having the same RSV and mole ratio of acrylamide, at lower dosages and in finer incremental dosages than in Table I. This Table also illustrates that the hydrophilic dispersion polymers are superior at turbidity reduction to hydrophobic dispersion polymers, as less can be used to achieve demulsification.

TABLE II

| Turbidity as a Function of Polymer Dosage | | |
|---|---|---|
| | Treatment | |
| Dose[1](ppm) | A[2] | C[4] |
| 0.5 | 135 | 117 |
| 1 | 86 | 53 |
| 1.5 | 59 | 46 |
| 2 | 56 | 37 |
| 2.5 | 34 | 34 |
| RR[5] | 1 | 0.8 |

[1]on an equal actives basis
[2]hydrophobic dispersion copolymer poly(DMAEA.BCQ/AcAm), 10/90 mole ratio, RSV = 15–20 dL/g measured at a concentration of 0.045% polymer in 0.25 M $NaNO_3$, available from Nalco Chemical Co. of Naperville, IL
[4]hydrophilic dispersion copolymer poly(DMAEA.MCQ/AcAm) 10/90 mole ratio, RSV = 15–20 dL/g measured at a concentration of 0.045% polymer in 1 M $NaNO_3$, available from Nalco Chemical Co. of Naperville, IL
[5]replacement ratio Table III demonstrates the improvement in efficiency of type C polymers over type A polymers in a third type of waste water stream. The general trend of improved efficiency is also evident here. Therefore, Tables I–III show that in a variety of waste water streams, the novel type C polymers would be preferred for emulsion breaking, as a lower dosage would be required.

TABLE III

| Turbidity as a Function of Polymer Dosage | | |
|---|---|---|
| | Treatment | |
| Dose[1](ppm) | A[2] | C[4] |
| 2 | 93 | 91 |
| 4 | 75 | 67 |
| 6 | 66 | 45 |
| 8 | 50 | 43 |
| 10 | 46 | 47 |
| RR[5] | 1 | 0.6 |

[1]on an equal actives basis
[2]hydrophobic dispersion copolymer poly(DMAEA.BCQ/AcAm), 10/90 mole ratio, RSV = 15–20 dL/g measured at a concentration of 0.045% polymer in 0.25 M $NaNO_3$, available from Nalco Chemical Co. of Naperville, IL
[4]hydrophilic dispersion copolymer poly(DMAEA.MCQ/AcAm) 10/90 mole ratio, RSV = 15–20 dL/g measured at a concentration of 0.045% polymer in 1 M $NaNO_3$, available from Nalco Chemical Co. of Naperville, IL
[5]replacement ratio Table IV illustrates the results for another type of hydrophilic dispersion, polymer D, poly(diallyldimethyl ammonium chloride/acrylamide), in comparison to a latex polymer E polymerized from the same monomeric components of the same molar ratios. D is more effective at lower dosages than E.

TABLE IV

| Turbidity as a Function of Polymer Dosage | | |
|---|---|---|
| | Treatment | |
| Dose[1](ppm) | D[5] | E[6] |
| 4 | 59.7 | — |
| 5 | 51 | 60.6 |
| 6 | 49 | 58.1 |
| 7 | 54.9 | 49.8 |
| 8 | — | 62 |
| 9 | — | 78.6 |
| 10 | 65 | — |
| RR | 0.79 | 1 |

[1]on an equal actives basis
[5]hydrophilic dispersion copolymer poly(DADMAC/AcAm), 50/50 weight ratio, RSV = 4–6 dL/g measured at a concentration of 0.045% polymer in 1 M $NaNO_3$, available from Nalco Chemical Co. of Naperville, IL
[6]latex copolymer poly(DADMAC/AcAm), 50/50 weight ratio, RSV = 4–6 dL/g measured at a concentration of 0.045% polymer in 1 M $NaNO_3$, available from Nalco Chemical Co. of Naperville, IL Changes can be made in the composition, operation and arrangement of the method of the present invention described herein without departing from the concept and scope of the invention as defined in the following claims:

We claim:

1. A method of reducing turbidity and removing emulsified oil from industrial waste water streams which comprises the steps of:

a) adding from about 0.5 ppm to about 500 ppm of a water-soluble hydrophilic dispersion polymer to the waste water stream, said water-soluble polymer formed under free-radical forming polymerization conditions in a medium containing water, monomers, stabilizer polymer and an aqueous anionic salt solution, wherein said water-soluble polymer is formed from polymerization of monomers selected from the group consisting of i. acrylamide or methacrylamide; and ii. a cationic monomer selected from the group consisting of:

diallyl-N,N-dimethyl ammonium halides, and monomers of formula I

I

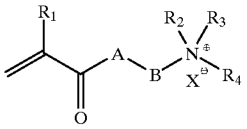

wherein $R_1$ is selected from the group consisting of hydrogen and methyl groups, $R_2$ and $R_3$ are selected from the group consisting of $C_1$ alkyl and $C_2$ alkyl groups; $R_4$ is selected from the group consisting of hydrogen, $C_1$ alkyl and $C_2$ alkyl groups; A is selected from the group consisting of an oxygen atom and NH; B is selected from the group consisting of $C_2$ alkyl, $C_3$ alkyl and $C_4$ alkyl groups and $X^-$ is an anionic counterion wherein the mole ratio of acrylamide or methacryamide to cationic monomer is from about 95:5 to about 50:50 to demulsify said oil, reduce said turbidity, and form an oil phase and a water phase;

b) recovering said water phase.

2. The method of claim 1 wherein said monomers of formula I are selected from the group consisting of dimethylaminoethylacrylate methyl chloride quaternary salt and dimethylaminoethyl methacrylate methyl chloride quaternary salt.

3. The method of claim 2 wherein said monomer of formula I is dimethylaminoethyl acrylate methyl chloride quaternary salt.

4. The method of claim 1 wherein said cationic monomer is diallyldimethyl ammonium chloride.

5. The method of claim 1 wherein the water-soluble dispersion polymer is formed from polymerization of acrylamide and dimethylaminoethyl acrylate methyl chloride quaternary salt in a mole ratio of acrylamide to dimethylaminoethyl acrylate methyl chloride quaternary salt of about 90:10 and has an RSV of from about 15 to about 20 at a concentration of 0.045 percent polymer in 1M $NaNO_3$.

6. The method of claim 1 wherein the water-soluble dispersion polymer is formed from polymerization of acrylamide and diallyldimethylammonium chloride in a mole ratio of acrylamide to diallyldimethylammonium chloride of about 50:50 and has an RSV of from about 4 to about 6 at a concentration of 0.045 percent polymer in 1M $NaNO_3$.

* * * * *